United States Patent

Dunfield et al.

Patent Number: 5,581,424
Date of Patent: Dec. 3, 1996

[54] MAGNETIC CRASH STOP AND LATCH IN A DISC DRIVE

[75] Inventors: John C. Dunfield; Jeffrey P. Stram; Thomas A. Hickox, all of Santa Cruz County, Calif.

[73] Assignee: Seagate Technology, Inc., Scotts Valley, Calif.

[21] Appl. No.: 357,098

[22] Filed: Dec. 15, 1994

Related U.S. Application Data

[63] Continuation of Ser. No. 947,739, Sep. 21, 1992, abandoned.

[51] Int. Cl.⁶ ..................................................... G11B 5/54
[52] U.S. Cl. ............................................................ 360/105
[58] Field of Search ............................... 360/104–106, 360/97.01–98.01

[56] References Cited

U.S. PATENT DOCUMENTS

| | | | |
|---|---|---|---|
| 4,594,627 | 6/1986 | Viskochil et al. | 360/105 |
| 4,635,151 | 1/1987 | Hazebrouck | 360/105 |
| 4,692,829 | 9/1987 | Campbell | 360/105 |
| 4,881,139 | 11/1989 | Hazebrouck | 360/105 |
| 4,890,176 | 12/1989 | Casey et al. | 360/105 |
| 4,903,157 | 2/1990 | Malek | 360/105 |
| 4,937,692 | 6/1990 | Okutsu | 360/105 |
| 4,947,274 | 8/1990 | Casey et al. | 360/105 |
| 4,949,206 | 8/1990 | Phillips et al. | 360/106 |
| 4,985,793 | 1/1991 | Anderson | 360/105 |
| 4,999,530 | 3/1991 | Azuma et al. | 360/105 |
| 5,003,422 | 3/1991 | Sun et al. | 360/105 |
| 5,023,736 | 6/1991 | Kelsic et al. | 360/105 |
| 5,170,300 | 12/1992 | Stefansky | 360/105 |
| 5,187,627 | 2/1993 | Hickox et al. | 360/105 |
| 5,208,713 | 5/1993 | Lindsay et al. | 360/105 |
| 5,224,000 | 6/1993 | Casey et al. | 360/105 |
| 5,262,913 | 11/1993 | Stran et al. | 360/105 |
| 5,305,169 | 4/1994 | Anderson et al. | 360/105 |
| 5,343,346 | 8/1994 | Bleeke | 360/105 |
| 5,369,538 | 11/1994 | Moe et al. | 360/105 |

*Primary Examiner*—Jefferson Evans
*Attorney, Agent, or Firm*—Flehr, Hohbach, Test, Albritton & Herbert

[57] ABSTRACT

A magnetic crash stop and latch for limiting the motion of a transducer positioner assembly within a disc drive. The disc drive system has a transducer positioner assembly located within a housing for positioning one or more read/write transducers relative to a recording media within the housing. The apparatus includes components for latching an actuator assembly in a disc drive. A parking force is created by selectively attaching a small magnet (or one or two small ferrous metal slugs) to the end of the actuator arm portion of the actuator assembly having the voice coil motor (VCM). The small magnet (or slugs) operating in combination with the fixed magnetics of the VCM produces torque on the actuator assembly when the small magnet passes outside (or the slugs pass inside) of the magnetic field generated by the fixed magnetics. The resultant torque is utilized to move the actuator arm to contact a latch means. The latch means is preferably a ramp, but may be a magnetic latch created by the two slugs, mechanical latch, or a combination using both magnetic and mechanical apparatus as is known in the art. The magnet or slug is positioned so that it does not affect the normal torque or forces that are used to move the arm.

17 Claims, 9 Drawing Sheets

MAGNETIC CRASH STOP AND LATCH IN A DISC DRIVE

This is a continuation of application Ser. No. 07/947,739 filed Sep. 21, 1992, now abandoned.

FIELD OF THE INVENTION

The present invention relates generally to an improved latching arrangement for transducer positioner assemblies in disc drives. More particularly, the invention relates to magnetic crash stop and latch apparatus for limiting the movement of rotatable transducer positioner assemblies.

BACKGROUND OF THE INVENTION

Typically, a Winchester-type disc drive is comprised of: one or more discs attached to a spindle motor such that the motor rotates the disc at a proscribed rate; an actuator assembly (also known as a transducer positioner assembly) including a read/write transducer assembly, a pivot, and a voice coil motor (VCM) to cause the assembly to pivot and position the transducer assembly over the discs; and a frame by which the pivot, VCM and the spindle motor are supported. As is well known in the art, a number of transducers may be mounted upon a single actuator assembly in order to access information on several stacked rotating discs. Various sorts of electronics to read and write data from and to the transducers, control the speed of the spindle motor, and control the position of the actuator assembly relative to the disc are also present in a typical disc drive.

During normal operation the transducers, also known in the art as heads, "float" above the disc surface accessing the information magnetically stored on the disc (reading) or placing new information on the disc (writing). The rotation of the disc causes air currents which create an "air bearing" to support the transducers above the disc surface. However, when the disc stops spinning, the air bearing ceases to exist, and without taking precautions, the transducers will impact the disc surface. Consequently, serious damage can result to the disc surface as the transducers come to rest on the disc surface. Therefore, much research has been focused upon methods to move the actuator assembly to park the transducer away from the disc surface prior to powering down the disc drive.

An orderly power down provides ample notice for the disc drive electronics to command the actuator assembly to a parked position. However, unscheduled power downs, such as occur during power outages, present a different problem since the internal electronics will not have sufficient time to park the actuator. For these instances, an automatic parking system that is activated when power is lost is desirable.

Typically, the parking is accomplished by pivoting the actuator arm portion which carries the transducers away from the discs to contact a latching means for maintaining the actuator arm portion in a fixed, parked position. The latching means is typically a ramp member, but may be a magnetic latch, mechanical latch, or some combination of mechanical and electrical apparatus.

To facilitate parking, the transducers are attached to a flexible portion or flexure which slides up the ramp member distancing the transducers from the disc. The ramp member supports the flexure and ensures that the transducers cannot impact the disc surface during shipping and other situations involving rough handling while the power is off.

The problem facing designers is how to move the flexure up the ramp member, or into contact with other forms of latches, when external power has been disconnected. One example of generating power to accomplish the parking procedure uses the kinetic energy (back-EMF) of the spindle motor as it spins to a stop after the power has been extinguished. By rectifying the back-EMF voltage from the spindle motor, a sufficient voltage is generated to enable power to be applied to the actuator assembly's voice coil motor, pivot the assembly, and drive the flexure onto the ramp or into contact with other latch means. However, this method necessitates using a complex arrangement of switching, impedance matching, and back-EMF rectification circuitry. Additionally, to facilitate the utilization of as much generated power as possible, the circuits are constructed from costly low loss components.

In addition to protecting the transducers by parking the actuator assembly, apparatus must be provided to ensure that the actuator assembly cannot excessively rotate about its pivot and cause the transducers to impact the hub to which the disc is mounted. Impact with the hub may cause severe damage to the transducers. To limit the actuator arm's motion a crash stop is usually provided. Typically, a crash stop is a metal flange having a piece foam rubber attached to it to partially absorb the shock of impact. In operation, the arm will impact the crash stop and cease rotation when the transducer is near the hub. Though effective in stopping the transducers from impacting the hub, the shock associated with a mechanical crash stop can cause misalignment of the heads or unbalance the bearings which support the actuator arm at the pivot.

An object of the present invention is to provide a simple apparatus to aid in parking the actuator assembly. The simplicity of the invention will result in lower overall disc drive manufacturing costs.

Accordingly, it is a primary objective of the present invention to provide an effective head positioning assembly latching and crash stop arrangement that has a low part count and is easy to assemble at low cost.

Another object of the present invention is to reduce the VCM torque requirement during normal parking maneuvers. The invention provides a supplemental force to move the flexure up the ramp, thus a less powerful and smaller VCM is possible.

Another object of the present invention is to reduce the spindle motor back-EMF requirement. In some applications, the present invention may not provide enough force to fully park the transducers. In these cases, the present invention will be used to supplement the rectified back-EMF power generation system. In doing so, the supplemental force will be large enough to enable the design to be accomplished without using low loss specialty components to rectify the back-EMF signals. More specifically, the approach taken in the present invention reduces the need for providing a motor with a high motor constant, an important advantage since the cost of a motor increases with need for a higher motor constant. Prior to the development of the present design, it was necessary to design the spindle motor with low motor resistance so that enough current was delivered to the voice coil when the only voltage source was back-EMF to drive it to the park position. With the supplemental driving force provided by the present invention, the design can tolerate a higher winding resistance in the spindle motor, and of course a higher resistance in the voice coil motor also, which reduces cost in one or both of the elements of primary expense in a disc drive design.

Another objective of the present invention is to provide a latch and crash stop arrangement which does not rely upon the impact of the moving actuator assembly to be effective.

SUMMARY OF THE INVENTION

To achieve the foregoing and other objectives and in accordance with the purpose of the present invention, a magnetic crash stop and latch is provided for a disc drive system having an actuator assembly for positioning a plurality of transducers relative to a recording media located within a disc housing. The magnetic crash stop and latch is created by attaching a steel slug or a small magnet to the actuator arm, such that the slug magnetically interacts with the fixed magnetic elements of the voice coil motor. As the transducers read and write data, the slug or magnet do not perturb these functions. However, if the transducer positioner assembly excessively rotates, the interaction between the slug or magnet and the VCM magnetic circuits will constrain the motion without the use of physical elements. Additionally, the transducer positioner assembly can be rotated to a position placing the transducers adjacent to the disc and the interaction between the magnet and the VCM magnetic circuits provide a parking force to hold the assembly in a stationary position.

The small magnet is oriented such that operating in combination with the fixed magnetics of the VCM, torque is applied to the actuator assembly when the small magnet passes within the magnetic field generated by the fixed magnetics. In accordance with the invention, the resultant torque is utilized to move the actuator arm to contact a latch means.

The latch means is preferably a ramp, but may be a magnetic latch, mechanical latch, or a combination using both magnetic and mechanical apparatus as is known in the art.

Alternatively, the small magnet is positioned on the VCM end of the actuator arm assembly such that the small magnet interacts with the magnetic field in the transition region between the poles of the fixed magnetics of the VCM. As a consequence of this interaction, torque is produced to park the actuator assembly.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
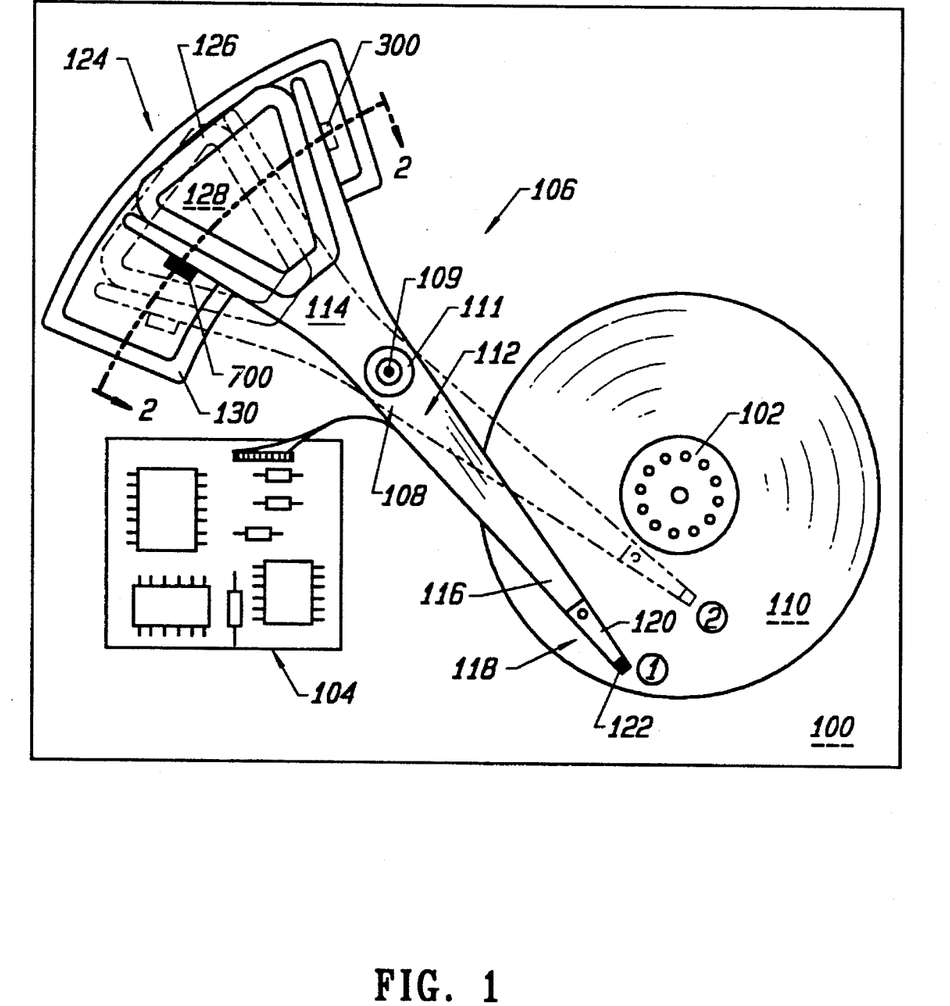
FIG. 1 depicts the preferred embodiment of the crash stop portion of the invention as applied to a typical disc drive assembly.

Referring to the drawings, wherein like numerals indicate like parts, and initially to FIG. 1, there is shown a disc drive assembly having a frame 100 supporting a spindle motor 102 (only the hub portion is shown at 102), electronics 104, and an actuator assembly 106 (also known as a transducer positioner assembly) at a pivot 108. The spindle motor 102 is depicted as an in-hub type, but can be any type of spindle motor known in the art. The motor 102 is mechanically secured to at least one disc 110 of conventional construction such that the spindle motor 102 causes the disc 110 to rotate at a high speed.

The actuator assembly 106 includes an arm portion 112 having a forked first end 114, a second end 116 and a pivot 108 centrally located along the arm portion 112 between the first end 114 and the second end 116. The pivot 108 is preferably a combination of a shaft 109 rigidly attached to the frame 100 and bearings 111 journaled about the shaft 109. The bearings 111 are disposed between the shaft 109 and the arm portion 112 such that the arm portion 112 may smoothly rotate about the pivot 108 and position the second end 116 over the disc 110. The actuator assembly shown is also a preferred embodiment; many variations in the actual design, e.g. for mounting the coil to the driven end of the arm are possible; the key issue here is the positioning of a slug or magnet (to be described below) on the arm to interact with the available magnetic fields.

Attached to the second end 116 of the arm portion 112 is a transducer assembly 118 comprising a flexible member 120 called a flexure and one or more transducers 122. In operation, the arm portion 112 pivots to extend the transducers 122 over the disc 110 and access data located thereon.

To cause the arm portion 112 to rotate, a voice coil motor (VCM) 124 is utilized. In general, the VCM has a voice coil 126 wound on a bobbin 128 which is disposed between the forks of the forked first end 114 of the arm portion 112, although other mountings are available. Additionally, stationary magnetic elements 130 are attached to the frame 100 in close proximity to the voice coil 126 and cooperate with the voice coil 126 providing locomotive torque rotating the arm portion 112 when the voice coil 126 is energized. Typically, the stationary magnetic elements are mounted above and below the voice coil. However, to clearly depict the invention the upper magnetic element is not depicted in FIG. 1. In operation, controlling the magnitude and direction of the coil energizing currents controls the direction and speed of the rotation of the arm portion 112 about the pivot 108.

Figure 2:
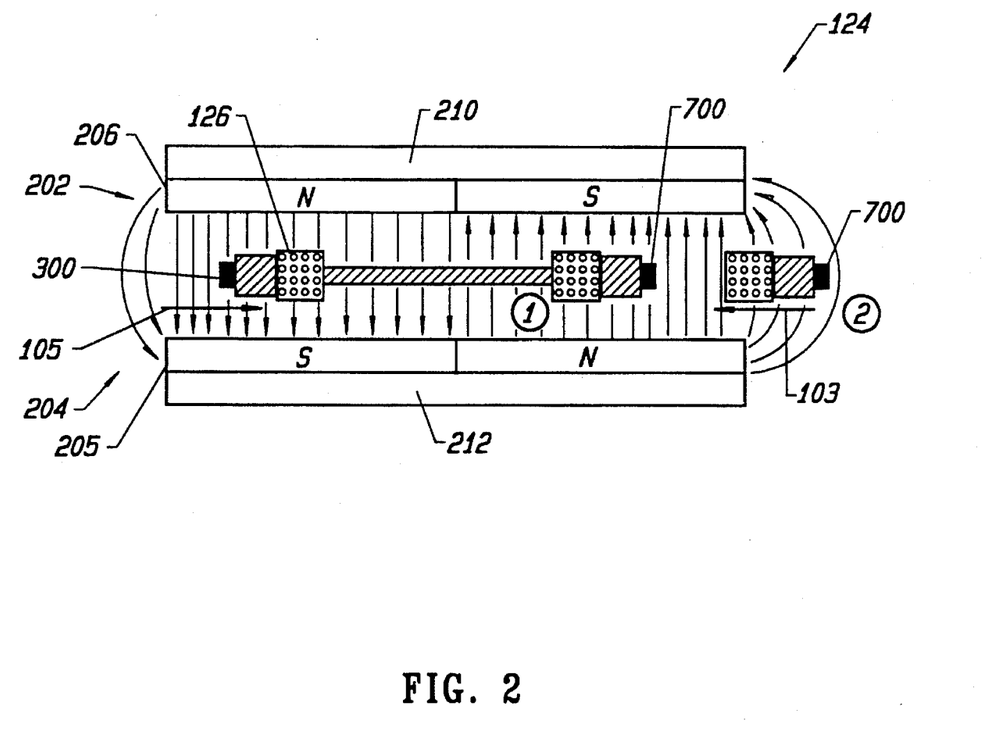
FIG. 2 depicts a cross sectional view of the voice coil motor and the preferred embodiment of the invention as depicted in FIG. 1.

Preferably, the fixed magnetic elements have upper 202 and lower 204 parts as shown in FIG. 2. One permanent magnetic 206 is fixed above the voice coil 126 and one permanent magnet 208 is fixed below the voice coil. Each permanent magnet 206, 208 has an associated backiron 210, 212 to complete the stationary magnetic circuit associated with the VCM 124. However, this preferred arrangement should not be construed as limiting the invention. Other actuator assemblies, having only a single permanent magnet fixed either above or below the voice coil are also foreseeable. Indeed, the principles of this invention are applicable to linear actuators as well, as explained below with reference to FIG. 8.

During normal operation, the actuator arm 112 must be prohibited from rotating excessively such that the transducer subassembly 118 cannot impact the motor hub 102. Impact of the very sensitive and precisely aligned transducers against the hub may cause significant and permanent damage to the transducers. To prevent excessive arm rotation, the magnetic crash stop of the invention is provided.

In accordance with the invention as depicted in FIGS. 1 and 2, a small iron or steel slug 700 is attached to the forked end 114 of the actuator arm 112. The slug 700 is positioned such that it interacts with the magnetic field generated in the gap between the fixed magnets 202, 204 of the VCM 124. The magnetic interaction causes the slug 700 to become an induced dipole.

Referring to FIG. 2, while in the gap (position 1) the slug 700 does not perturb the gap magnetic field and the VCM 124 operates in its normal fashion. However, as the transducer positioner assembly 106 rotates the transducer 122 toward the motor hub area 102, the slug 700 will begin to exit the gap. The gap magnetic field maintains an attractive force upon the slug 700 as it exits the gap (position 2). The force represented by arrow 103 tends to decelerate the motion of the actuator arm assembly 106, stop the motion toward the hub area 102, and return the slug 700 to the gap. Thus, the magnetic crash stop inhibits the transducers 122 from impacting the hub 102. Note that the crash stop does not impose any damaging impact forces upon the transducer positioning assembly 106 as is the case with mechanical crash stops.

The size of the slug 700 determines the magnitude of the crash stop force. However, an excessive slug dimension will add considerable mass to the actuator arm 112 which would impede the acceleration capabilities of the actuator 106. A slug 700 having dimensions 2 mm×2 mm×1 mm has been found sufficient for the magnetic crash stop application.

Alternatively, a second iron slug 300 can be placed upon the opposite fork of the actuator arm 112 to prevent the arm 112 from rotating excessively in the direction away from the disc area. This second slug 300 will impose a force 105 on the actuator to inhibit motion of the actuator beyond a defined range. Thus, placement of the steel slugs 300, 700 effectively limit the range of rotation of the actuator arm. Typically, the second slug 300 will have the same dimensions as the first slug 700.

Figure 3:
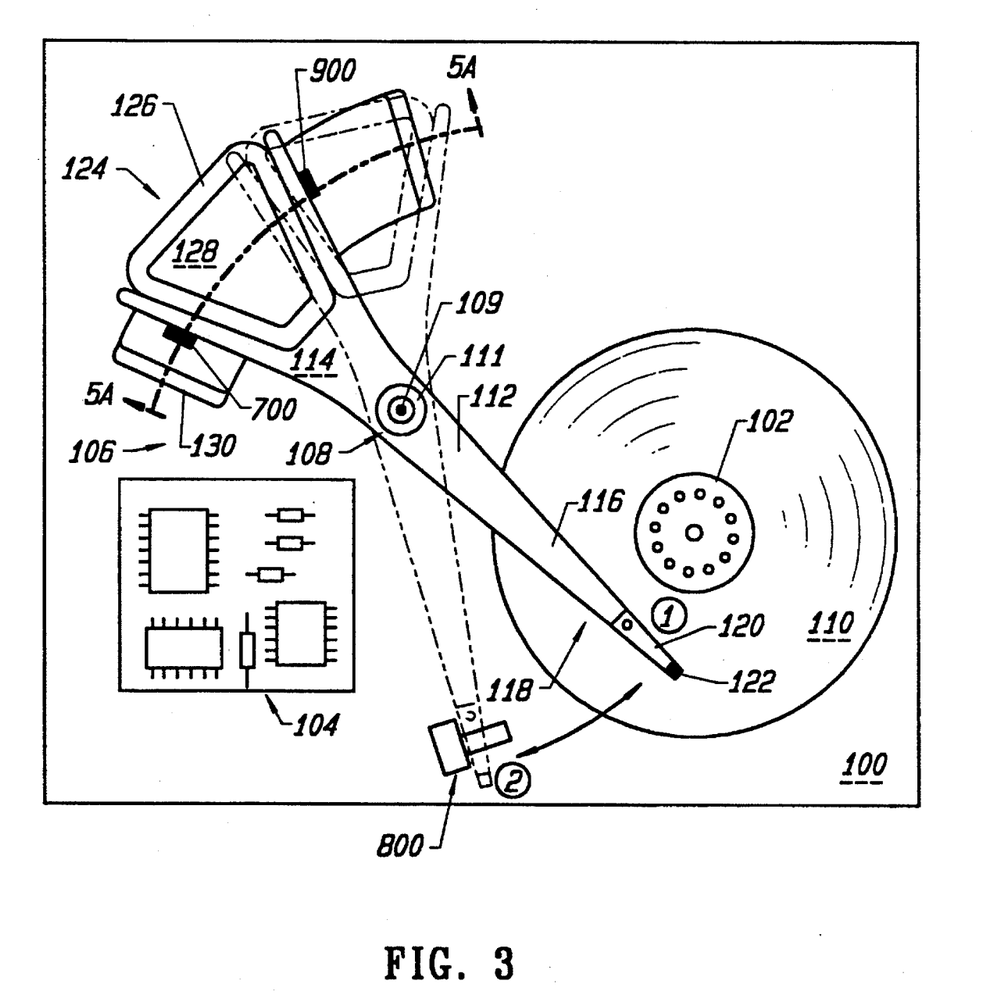
FIG. 3 depicts the preferred embodiment of the magnetic crash stop and latch invention having a mechanical latch as applied to a typical disc drive.

During normal operation, the transducer positioner assembly 106 positions the transducers 122 over the disc 110 to read and write data to the disc's magnetic surface. The operating position is shown in FIG. 3 as position 1. However, during periods when the disc 110 is not rotating, the transducer positioner assembly 106 must be parked in a stable position away from the disc 110 to ensure that the transducers 122 do not impact the disc 110 and cause damage to the magnetic surface or the transducers. The parked position is depicted as position 2 in FIG. 3. Parking is typically accomplished by a latching means. Such means typically include magnetic latches, ramps, mechanical latches, and the like. Each requires physical contact between the latch means and the transducer positioner assembly.

Figure 4:
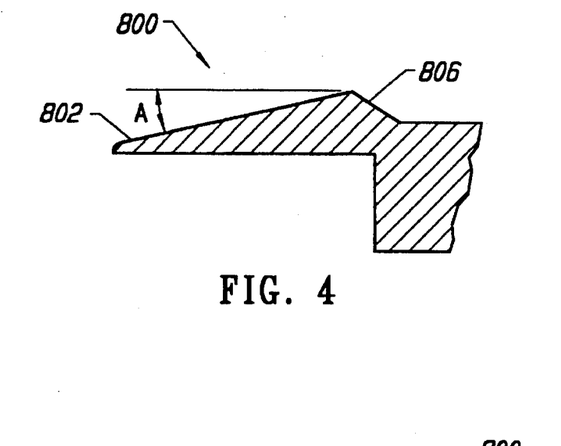
FIG. 4 depicts a cross-sectional view of a typical ramp member used for parking the actuator assembly.

In a preferred embodiment, with a latch arrangement using the invention shown in FIG. 3, a ramp member 800 is provided to facilitate fixedly parking the actuator assembly 106. However, as mentioned above, the invention should not be construed to be limited to this form of latch. FIG. 4 depicts a cross section of a typical ramp member 800 having a first slope angle A of approximately 8°. In achieving a controlled parked position, the flexure 120 is forced up a ramped area 802 of length (in this embodiment) 0.072 inch by the VCM 124 until the flexure 122 rests in the area having an opposing slope 806. In the resting position, the flexure 122 is forced upward by the ramp member 800 away from its natural position to generate a frictional holding force against the sloped portion 806 of the ramp member 800. This frictional force maintains the actuator assembly 106 in the fixed, park position throughout shipping and other rough handling conditions.

Upon restart, the VCM 124 applies a force greater than the static frictional parking force and frees the actuator assembly 106. The transducers 122 are then moved to the read/write position above the disc surface, as the rotating disc rotates rapidly enough to create an air bearing between the disc and the transducer.

A difficulty arises when the disc drive power is extinguished prematurely and the actuator assembly 106 cannot be parked in a controlled manner by the VCM 124 as described above. In this instance, apparatus for creating a parking force from little or no electrical power is necessary. A variation of the preferred embodiment of the invention provides the necessary parking force, either in total or as a supplemental force to assist other force generating means.

Figure 5A:
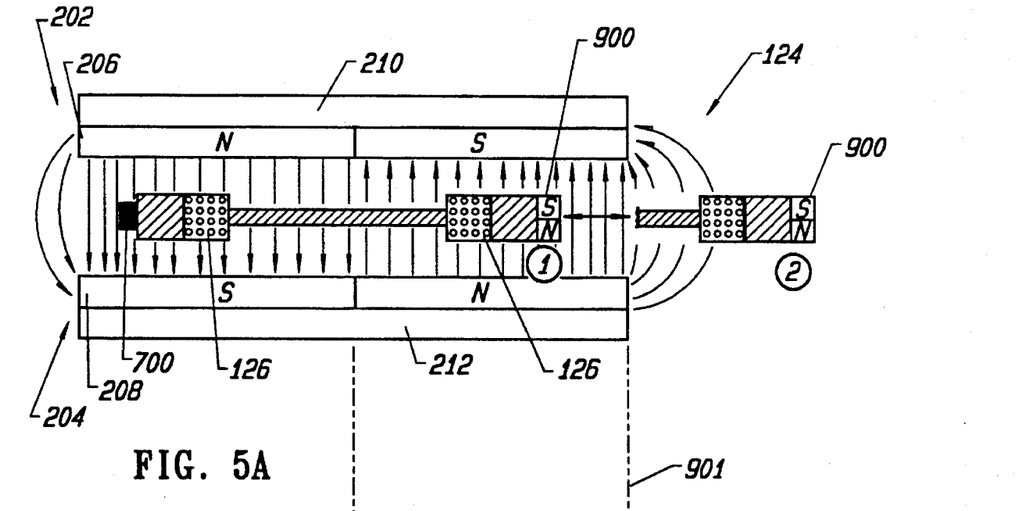
FIG. 5A depicts a cross-sectional view of the voice coil motor and the preferred embodiment of the invention as depicted in FIG. 4.

In accordance with this embodiment and as depicted in FIG. 3, a small magnet 900 is secured to one fork of the second end 114 of the actuator arm portion 112. Referring to FIG. 5A, a cross-sectional view of the VCM 124 using the invention, the small magnet 900 is positioned to align its poles with those of the fixed magnets 202, 204. During normal read/write operation, the fork 114 and the small magnet 900 never extend beyond the edge of the permanent magnets 206, 208 (position 1). Thus, the linear magnetic field in the gap through which the voice coil 126 moves is not perturbed by the introduction of the small permanent magnet 900. However, as the arm portion moves the small permanent magnet 900 past the edge of the permanent magnets 206, 208 of the VCM 124, the magnetic field is no longer linear and the repulsive force from the fixed VCM magnets 206, 208 upon the small permanent magnet 300 moves the small magnet 300 away from the fixed magnets 206, 208 (position 2). The repulsive force creates enough torque on the actuator arm portion 112 to force the flexure 120 up the ramp member 800 to the parked position.

To provide a comprehensive crash stop and latch arrangement, a steel slug 700, as described with respect to FIG. 3, is attached to the forked end 114 of the actuator arm 112 to ensure that the transducers 122 do not impact the hub 102. Thus, magnet 900 and ramp 800 form a latch; slug 700, which provides attractive force only, creates a magnetic crash stop.

Figure 5B:
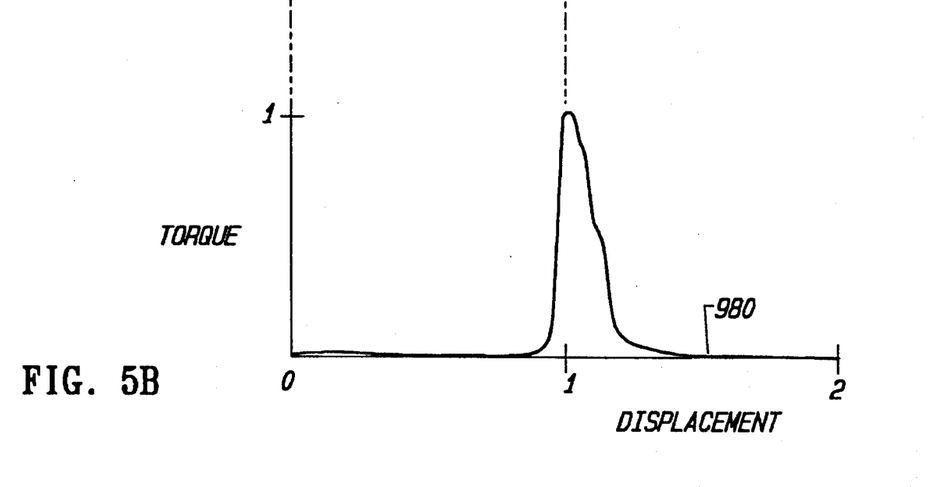
FIG. 5B graphically portrays the torque supplied by the preferred embodiment versus position of the actuator arm portion.

A graphical depiction of the torque profile due to the small magnet 900 is shown in FIG. 5B. The displacement from the center, ordinate 901 of FIG. 5B, is comparable to the small scale cross-section view shown in FIG. 5A. Note that the small magnet 900 has an insignificant effect upon the actuator arm portion 112 while the arm is supporting the transducer in the data recording region of the disc. However, as the small magnet 900 is moved past the edge of the permanent magnets 202, 204 of the VCM 124, a significant torque is generated by the repulsive force of the VCM magnets 202, 204 upon the small magnet 900. This torque is sufficient to drive the flexure 120 up the ramp member 800 to the park position.

Small magnets on the order of 1 mm by 1 mm by 1 mm have been used in testing and found to be capable of providing a 0.003 newton torque necessary to park the actuator assembly 106. Furthermore, this magnitude of torque is small enough to be easily overpowered by the VCM 124 when the VCM 124 is repowered. Thus, the probability is low that the actuator assembly 106 will be inadvertently parked during normal disc drive operation.

To provide a comprehensive actuator assembly 106 parking system, the parking force of the small magnet 900 can be used to supplement a parking force created by a traditional parking force generating means.

In a traditional system, the parking force of the VCM 124 must overcome the momentum of the actuator arm portion 112 moving away from the traditional latching means and, additionally, supply enough force to drive the flexure 120 up a ramp or into contact with other latch types to achieve a parked position. To accomplish this fete, previous systems have used very low loss electronics to rectify the back-EMF signals and supply enough power to the VCM 124 to park the transducer positioner assembly 106. However, the components are very costly.

The present invention can supplement the power recovered from the back-EMF signals. In other words, the back-EMF signals are used to counter the actuator arm portion's momentum or overcome its inertia and move the actuator assembly 106 toward the ramp 800, but the small magnet 900 of this invention provides the parking force. Thus, less rectified back-EMF power is needed, higher losses are acceptable in the rectification circuitry, and consequently, lower cost components may be used at a substantial manufacturing savings.

Figure 6:
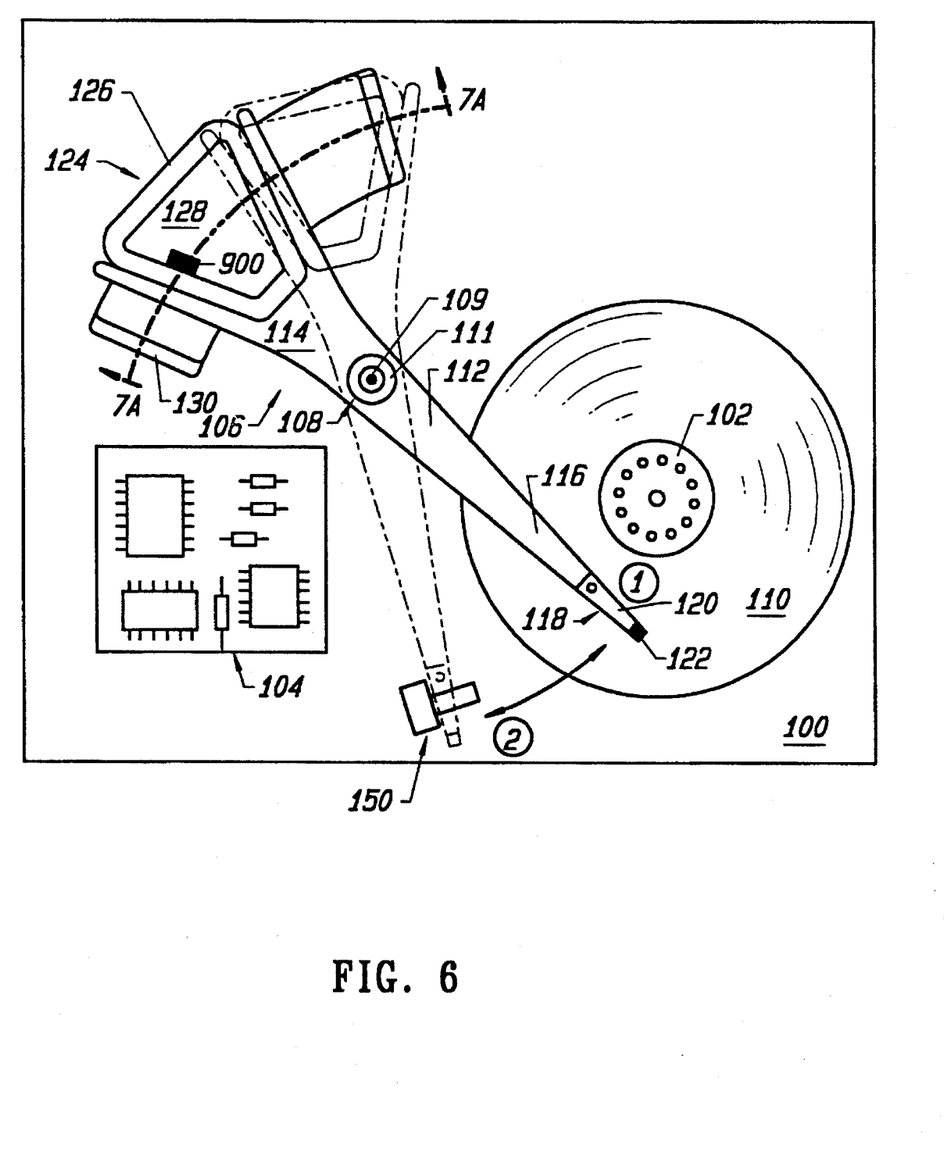
FIG. 6 depicts an alternative embodiment of the present invention having a mechanical latch as applied to a typical disc drive assembly.

Another alternative embodiment is depicted in FIG. 6. For the most part, the actuator assembly construction is identical to the construction of the preferred embodiment depicted in FIG. 3. However, the placement of the small magnet 900 used to supply the parking force or supplement the parking force generated by other means is different. As depicted in FIG. 6, the small magnet 900 is located on the coil winding bobbin 128, inside the coil 126, and on the side nearest to the parking ramp 800.

Figure 7A:
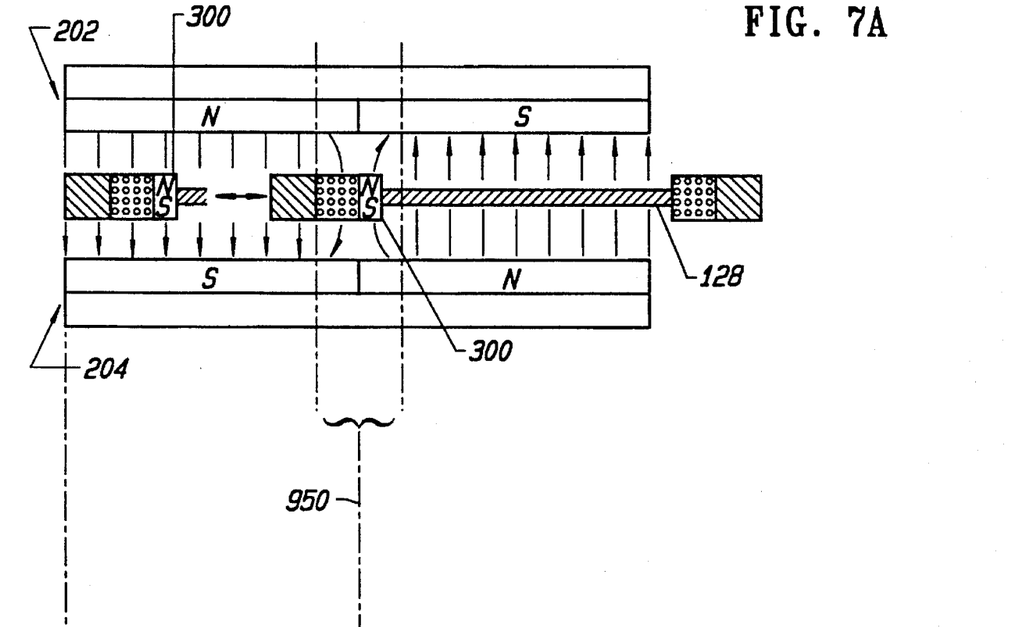
FIG. 7A depicts a cross-sectional view of the voice coil motor and the alternative embodiment of the invention as depicted in FIG. 6.
Figure 7B:
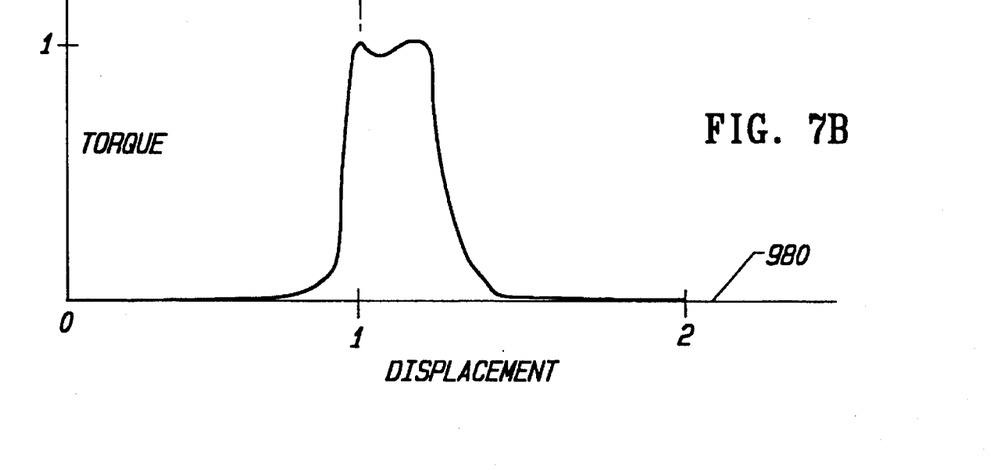
FIG. 7B graphically portrays the torque supplied by the alternative embodiment versus position of the actuator arm portion.

FIG. 7A shows the alternative embodiment depicted in FIG. 6 in a cross sectional perspective through the VCM 124. As in the previously described embodiment, during data read/write operation the small magnet 900 does not perturb the magnetic fields which control the VCM 124. The parking force is generated when the actuator assembly is moved by control signals to the VCM or back-EMF from the spindle motor to position the small magnet 900 in the transition zone 950 between the poles of the upper 202 and lower 204 magnetic elements. In this area, the small magnet 300 is attracted by the magnetic field of the oppositely polarized magnetic elements on the other side of the transition zone 950. This attractive force provides the torque necessary to move the flexure 120 to the parked position on the ramp 800. The profile of the resultant torque versus position of the actuator arm portion 112 appears in FIG. 7B.

Figure 8:
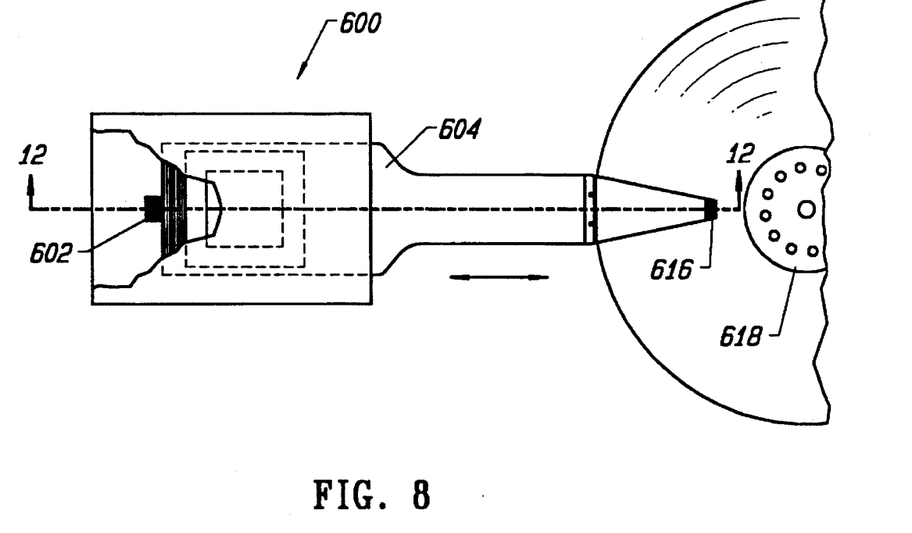
FIG. 8 depicts a sectional view of the alternative embodiment of the invention as applied to a linear actuator assembly.
Figure 9:
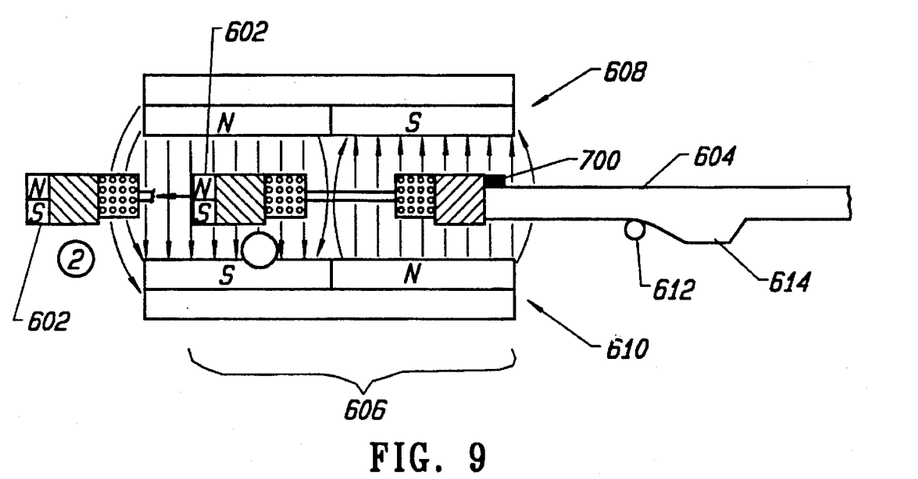
FIG. 9 depicts a cross-sectional view along line 12—12 in FIG. 11.

Moreover, as depicted in FIG. 8 and the cross-sectional view in FIG. 9, the invention is useful in limiting the motion of an actuator arm in a linear actuator VCM 600. As depicted in FIG. 9, a small magnet 602 is used in combination with an integral ramp 614 and cam 612 to generate a parking force to park the actuator arm 604 during non-use. Steel slug 700 is provided to generate a force which ensures that the linear actuator transducers 616 do not impact the hub 618.

Figure 10:
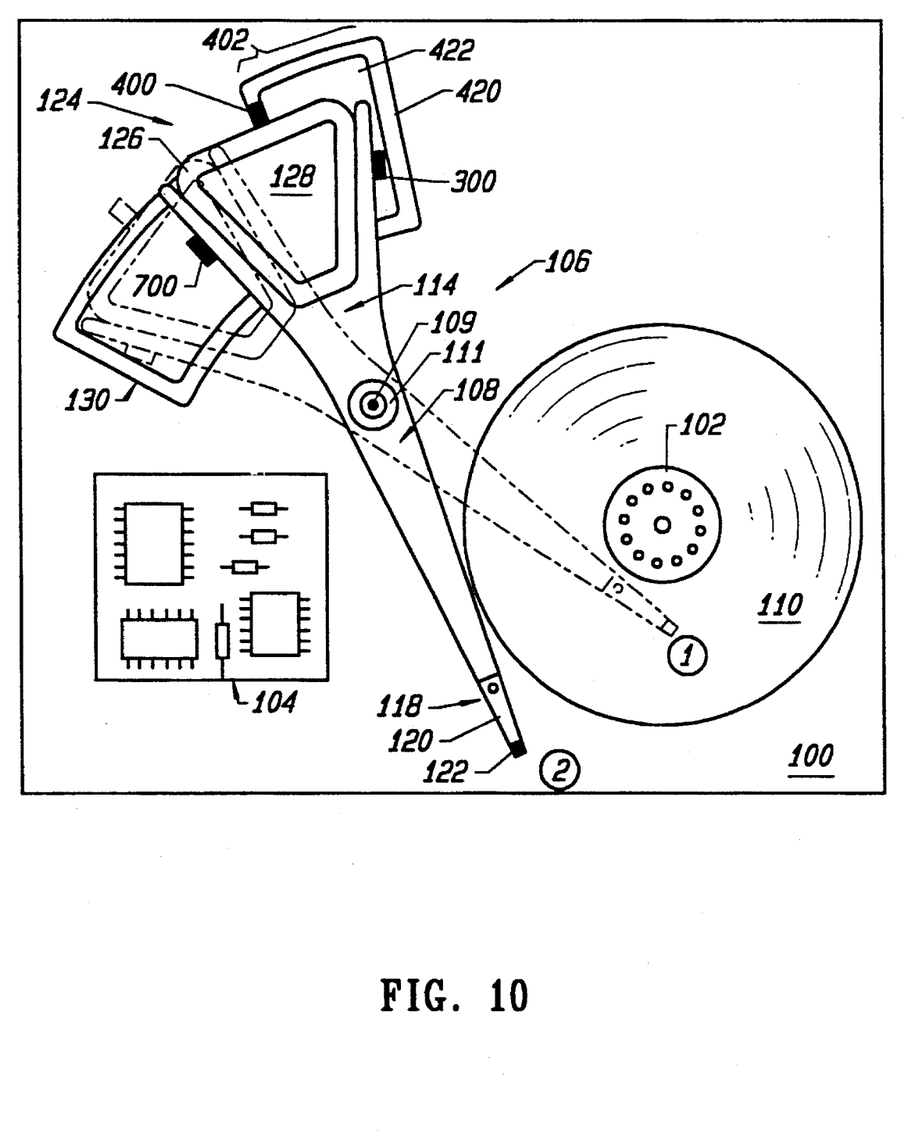
FIG. 10 depicts another alternative embodiment of the present invention having a magnetic latch.
Figure 11:
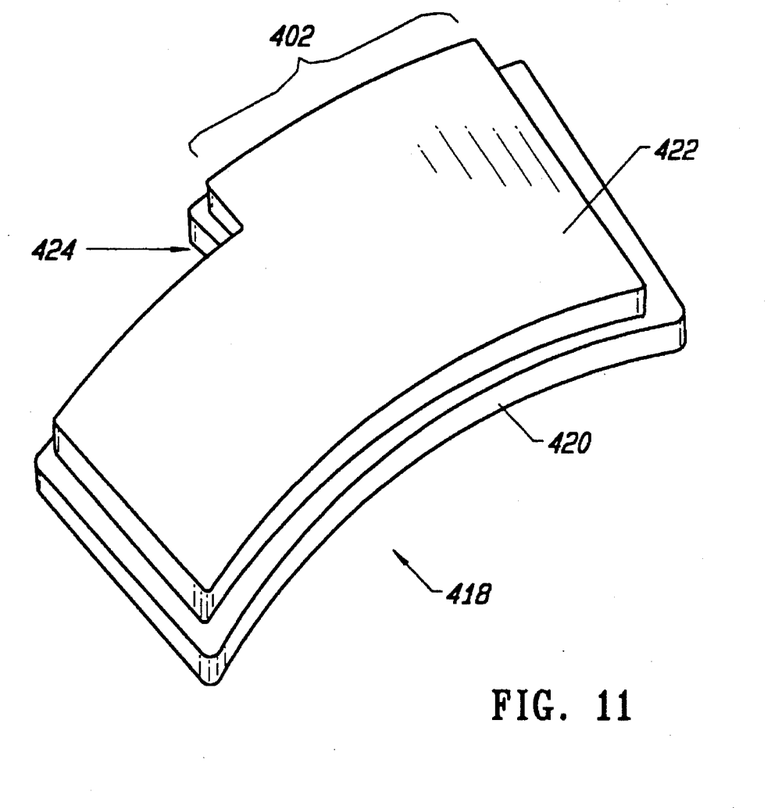
FIG. 11 depicts perspective view of a VCM stationary magnetic element in accordance with the alternative embodiment.

In accordance with an alternative embodiment of the invention, a magnetic latch is provided to eliminate or diminish the need for latching means which, in operation, are necessarily impacted by the actuator arm. Referring to FIG. 10, the magnetic latch is represented by the combination of elements comprising slug 300, magnetic latch 400, and extending portion arm 402. The magnetic crash stop slug 300 limits the rotation of the actuator arm assembly 106 in the direction away from the disc 110, but the transducer assembly 118 is stopped adjacent to the disc 110. To implement the magnetic latch, the stationary magnets 130, both magnets and backirons, are designed to have a radially extending portion 402 which protrudes from the rear edge of the magnetic assembly partially along the rear edge. FIG. 10 depicts only the bottom element. FIG 11 shows a perspective view of the magnetic assembly 418 alone. Both the backiron 420 and the magnet 422 protrude along the rear edge 424 of the magnetic assembly 418. Both the upper 450 and lower 418 magnetic assemblies are constructed with the radially extending portion 402.

As depicted in FIG. 10, a steel flag 400 protrudes from the transducer positioner assembly 106. The flag 400 is attached to the bobbin 128 such that at the point when the crash stop slug 300 is being retained by the magnetic field of the gap, i.e., near the edge of the gap, the magnetic field in the gap of the radially extending portion 402 is attractively interacting with the flag 400. As a result of this arrangement, a magnetic detent area is produced wherein the actuator arm is held in a stationary position by the attractive forces on the slug 300 and the flag 400. The detent area is positioned such that the transducer assembly 118 is parked adjacent to the disc 110.

Figure 12:
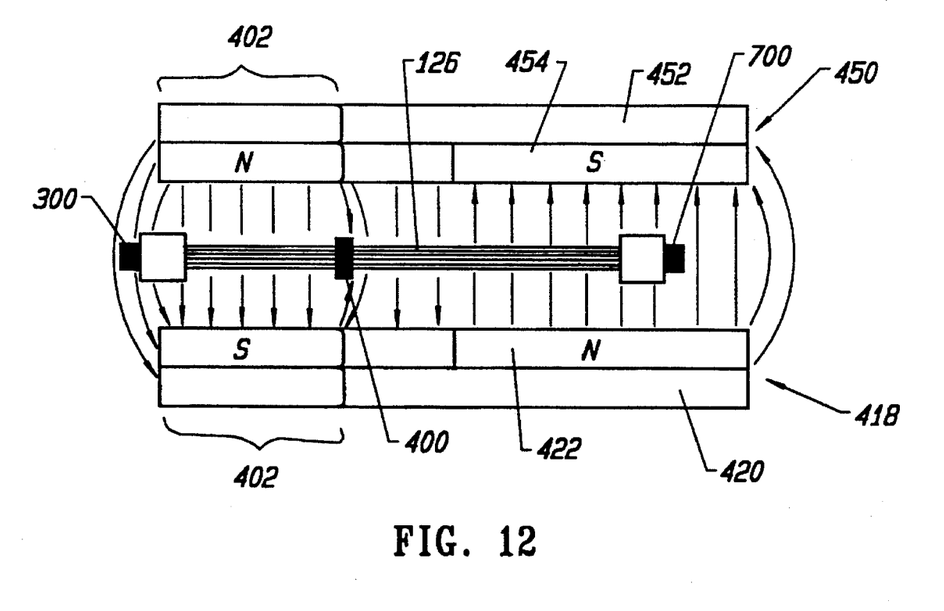
FIG. 12 depicts a cross sectional view of the voice coil motor and the alternative embodiment of the invention as depicted in FIG. 10.

FIG. 12, a rear view of the VCM 124, clearly shows the magnetic interaction which produces the detent. The upper 450 and lower 418 stationary magnetic assemblies having backirons 420, 452 and magnets 422, 454 are positioned to form a gap through which the voice coil 126 and the actuator arm 112 may pass. The crash stop slugs 300, 700 travel within the gap during regular operation of the transducer positioner assembly 106 without perturbing the magnetic field in the gap. As discussed previously, slug 700 prevents the transducers from impacting the motor hub and disc mounting area 102. The steel flag 400 extends beyond the stationary magnetic assemblies 418, 450 while the transducer positioner assembly 106 is reading and writing data; therefore, during normal operation it does not affect the actuator operation. However, when the power is removed from the disc drive, the VCM, using the traditional back-EMF techniques or, in the alternative, a mechanical technique, moves the transducer positioner assembly 106 toward the latched position, position 2 in FIG. 10.

As the flag 400 approaches the magnetic field in the gap of the radially extended portion 402 of the stationary magnetic assemblies 450, 418, the attractive force between the steel flag 400 and the magnets 454, 422, rotates the transducer positioner assembly 106 in a clockwise direction (FIG. 10). However, the rotation is constrained by the magnetic crash stop slug 300. In the latched position, the transducer positioner assembly 106 is held stationary by the attractive magnetic force of the stationary magnetic assemblies of the VCM 124 interacting with the flag 400 and the magnetic crash stop slug 300.

Upon restart, the VCM 124 applies a force greater than the parking force, i.e., the attractive force on the flag 400, and frees the transducer positioner assembly 106. The transducers 122 are then moved to the read/write position above the disc surface. The attractive force which must be overcome is determined by the size of the flag 400 and its proximity to the magnetic field. Typically, the flag is 1 mm×1 mm and, in the parked position, is maintained just outside of the gap between the radially extending portion 402. This arrangement creates a detent which will maintain the actuator arm in the parked position during rough handling, but the detent is easily overcome with a standard VCM torque.

Typically, a difficulty arises when the disc drive power is extinguished prematurely and the transducer positioner assembly 106 cannot be parked in a controlled manner by the VCM 124 as described above. In this instance, apparatus for creating a parking force from very little electrical power is necessary. This alternative embodiment of the invention provides a supplemental parking force to assist other force generating means.

To facilitate a comprehensive transducer positioner assembly parking system, the parking force of the flag 400 can be used to supplement a parking force created by a traditional parking force generating means. To this end, a traditional system rectifies the back-EMF signals from the spindle motor 102 as the motor 102 spins to a stop after power has been lost. The rectified signal is channeled to power the VCM 124 and move the flag 400 toward the radially extending portion 402 of the VCM magnets 454, 422. However, at times, the arm portion 112 may be traveling away from the radially extending portion 402 at the moment power is lost.

The present invention can supplement the power recovered from the back-EMF signals. To this end, the back-EMF signals are used to counter the actuator arm portion's momentum and move the transducer positioner assembly 106 toward the protruding portion 402. The flag 400 of the invention provides the parking force as it becomes near to the radially extending portion 402 and is attracted by the gap magnetic field. Moreover, power is not needed to drive the flexure 120 up a ramp or into contact with other latching means. Thus, less rectified back-EMF power is needed, higher losses are acceptable in the rectification circuitry, and consequently, lower cost components may be used at a substantial manufacturing savings.

The above description of the various embodiments of the invention is not meant to imply that the invention is only useful in a disc drive having a single disc. The disc drive depicted in the drawings is shown for illustrative purposes only and should not be construed as limiting the invention. In fact, the magnetic latch and crash stop apparatus herein disclosed may be used in disc drives having a plurality of transducers operating in conjunction with a plurality of vertically stacked discs or any other disc drive arrangement having a rotary head positioner assembly.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Magnetic crash stop and latch apparatus for a disc drive system having a transducer positioner assembly having a voice coil motor for positioning at least one transducer relative to a recording media, the transducer positioner assembly being moveable with respect to a disc drive frame and the recording media, the magnetic crash stop and latch apparatus comprising:

said voice coil motor having two stationary magnetic assemblies positioned in a confrontational manner forming a gap and having a voice coil mounted to a first end of said transducer positioner assembly which passes through said gap, and cooperating with said magnetic assemblies to position said transducer over said recording media;

at least one ferrous metal slug attached to said first end of said transducer positioner assembly adjacent said coil, said slug being positioned in said gap during read/write operations of said transducer positioner assembly, said slug upon exiting said gap cooperating with a fringing field of said magnetic assemblies to exert a force on said motor and on said transducer positioner assembly in a direction to return said slug toward said gap of said magnetic assemblies, each of said magnetic assemblies having an inner edge and an outer edge relative to a pivot axis of said transducer positioner assembly, wherein the outer edges of said magnetic assemblies have corresponding portions which protrude radially with respect to said axis to form a magnetic detent area which interacts with said at least one ferrous metal slug to restrain the motion of said transducer positioner assembly.

2. The apparatus of claim 1 wherein said first end of said transducer positioner assembly is forked and said slug is positioned on said forked end to ensure that transducers attached to a second end of said transducer positioner assembly do not impact a centrally located hub of said recording medium.

3. The apparatus of claim 2 further including a second ferrous metal slug attached to said first end of said transducer positioner assembly opposite said first slug which by magnetic interaction with said stationary magnetic assemblies restrains the motion of said transducer positioner assembly.

4. The apparatus of claim 3 wherein said second ferrous metal slug is positioned on said transducer assembly to park said transducer positioner assembly such that a transducer attached to a second end of said transducer positioner assembly is adjacent to said recording media.

5. Magnetic crash stop and latch apparatus for a disc drive system having a transducer positioner assembly having a voice coil motor for positioning at least one transducer relative to a recording media, the transducer positioner assembly comprising an arm portion mounting said transducer at a first end and a portion of said motor including a voice coil at a second end, and being moveable with respect to a disc drive frame and the recording media, the magnetic crash stop and latch apparatus comprising:

at least one stationary magnetic element as a component of said voice coil motor mounted to said disc drive frame, said magnetic element creating a magnetic field which cooperates across a gap having first and second ends with said voice coil to define the position of said transducer positioner assembly, said magnetic element having coplanar adjacent north and south poles and a transition zone therebetween;

a latch means attached to said frame for parking said transducer positioner assembly to position said transducer in a stationary position distant from said recording medium; and a magnet mounted to said transducer positioner assembly and having magnetic poles aligned with a magnetic field generated by said stationary magnetic element of said voice coil motor and responsive to said transition zone to provide a force to move said transducer positioner assembly toward said latch means when a magnetic field of said magnet interacts with said magnetic field of said stationary magnetic element.

6. The apparatus of claim 5, wherein said latch means includes at least one ferrous metal slug mounted on said head positioner assembly that magnetically interacts with the magnetic field adjacent said gap to constrain the movement of said head positioner assembly.

7. The apparatus of claim 5, wherein said transducer positioner assembly includes a pivot substantially centrally located between said first and said second ends, and attached to said frame such that said arm portion is rotatable to position said second end over said recording medium, and wherein said magnet is positioned on said first end of said arm portion.

8. The apparatus of claim 7 wherein said voice coil motor includes a voice coil wound on a bobbin and attached to said first end of said arm portion, and wherein said magnet is positioned on said bobbin and is circumscribed by said coil.

9. The apparatus of claim 7 wherein said magnet is positioned on one side of said arm to move said arm toward and away from said latch, and a slug is positioned on the opposite side of said arm at said second end to restrain movement of said transducer toward said hub of said spindle motor.

10. In a disc drive including at least one disc rotatably attached to a spindle motor mounted on a frame and an actuator assembly having an arm portion having a forked first end, a second end, and a pivot substantially centrally located along said arm portion between said first and second ends and attached to said frame such that said arm portion may pivot to enable said second end to pass over said disc, a voice coil motor having a voice coil wound on a bobbin, said bobbin attached to said forked first end of said arm portion, and at least one stationary magnet attached to said frame and proximate to said voice coil, and a transducer subassembly attached to said second end of said arm portion, a magnetic crash stop and latch comprising:

a magnet having magnetic poles aligned with a magnetic field generated by said at least one stationary magnet of said voice coil motor to provide a supplemental force to move said actuator assembly toward latch means when a magnetic field of said magnet interacts with said magnetic field of said at least one stationary magnet, said magnetic crash stop and latch further including a ferrous metal slug attached to said first end of said arm portion which by magnetic interaction with said at least one stationary magnet restrains the motion of said actuator assembly and a ferrous metal flag attached to said first end of said arm portion which by magnetic interaction with a radially extending edge portion of said at least one stationary magnet in combination with said magnetic interaction on said ferrous metal slug forms a detent for said actuator assembly.

11. The magnetic crash stop and latch of claim 10, wherein said latch means includes a ramp member attached to said frame for parking said transducer subassembly in a stationary position distant from said disc.

12. The magnetic crash stop and latch of claim 10, wherein said magnet is positioned on said forked first end outside of said coil.

13. The magnetic crash stop and latch of claim 10, wherein said magnet is positioned on said bobbin and circumscribed by said coil.

14. The magnetic crash stop and latch of claim 10, wherein said disc drive includes a back-EMF system comprising means for tapping a voltage from said motor and applying it to said voice coil motor to move said actuator assembly after power to said disc drive has been ended.

15. The magnetic crash stop and latch of claim 10 wherein said at least one stationary magnet has a radially extending edge portion.

16. The magnetic crash stop and latch of claim 10 wherein said detent is positioned to park said actuator assembly such that a transducer attached to said second end of said arm portion is adjacent to said disc.

17. A magnetic crash stop and latch apparatus for a disk drive transducer positioning assembly comprising a magnet mounted proximate a voice coil on a forked end of the transducer positioning assembly where the magnet has magnetic poles aligned with a magnetic field generated by stationary magnetic elements of a voice coil motor which actuates said transducer positioning assembly to provide a force to move the transducer assembly towards latch means mounted adjacent a disc in said disc drive.

\* \* \* \* \*